(12) United States Patent
Zacche'

(10) Patent No.: US 8,905,750 B2
(45) Date of Patent: Dec. 9, 2014

(54) MACHINES FOR BLOWING OR STRETCH BLOW MOULDING OF BOTTLES

(71) Applicant: SMI S.p.A., Bergamo (IT)

(72) Inventor: Vanni Zacche', Bergamo (IT)

(73) Assignee: SMI S.p.A., Bergamo (IT)

( * ) Notice: Subject to any disclaimer, the term of this patent is extended or adjusted under 35 U.S.C. 154(b) by 148 days.

(21) Appl. No.: 13/671,596

(22) Filed: Nov. 8, 2012

(65) Prior Publication Data
US 2013/0115326 A1    May 9, 2013

(30) Foreign Application Priority Data

Nov. 9, 2011    (IT) .............................. MI2011A2033

(51) Int. Cl.
*B29C 49/56*    (2006.01)
*B29C 49/36*    (2006.01)
*B29C 49/06*    (2006.01)

(52) U.S. Cl.
CPC ................ *B29C 49/36* (2013.01); *B29C 49/56* (2013.01); *B29C 49/06* (2013.01); *B29C 2049/563* (2013.01)
USPC ....................................................... 425/541

(58) Field of Classification Search
CPC .......................... B29C 49/56; B29C 2049/563
USPC ....................................................... 425/541
See application file for complete search history.

(56) References Cited

U.S. PATENT DOCUMENTS

| | | | | |
|---|---|---|---|---|
| 2,290,129 A | * | 7/1942 | Hofmann et al. ............. | 425/525 |
| 3,599,280 A | * | 8/1971 | Rosenkranz et al. ......... | 425/541 |
| 3,632,261 A | * | 1/1972 | Gasior et al. .................. | 425/541 |
| 4,141,680 A | * | 2/1979 | Kauffman et al. ............ | 425/529 |
| 4,822,275 A | * | 4/1989 | Voss et al. ..................... | 425/541 |
| 6,805,548 B1 | * | 10/2004 | Evrard .......................... | 425/541 |
| 7,914,276 B2 | * | 3/2011 | Galloni ......................... | 425/541 |

FOREIGN PATENT DOCUMENTS

| | | |
|---|---|---|
| CN | 201872329 U | 6/2011 |
| EP | 1995038 A1 | 11/2008 |
| FR | 2825659 A1 | 12/2002 |

* cited by examiner

*Primary Examiner* — Robert B Davis
(74) *Attorney, Agent, or Firm* — Robert E. Alderson, Jr.

(57) ABSTRACT

Machines are provided for the blowing or stretch blow moulding of bottles or containers having a plurality of moulding units, each moulding unit having a first half-shell and a second half-shell, laterally hinged around a hinge pin having a hinge axis, and a bottom suitable for cooperating to cyclically form a closed cavity suitable for receiving a pre-heated preform and for allowing the expansion by stretch blow moulding of the preform inside the cavity so as to obtain a bottle, said moulding unit being arranged to cyclically assume a closed mould configuration and an open mould configuration by means of opening and closing elements of the half-shells towards and away from a closure plane X-X passing through said hinge axis, and movement elements of the bottom, wherein said half-shells and said bottom are actuated in a synchronized manner stating from a single motion inlet comprising a single cam coupling.

12 Claims, 6 Drawing Sheets

MACHINES FOR BLOWING OR STRETCH BLOW MOULDING OF BOTTLES

CROSS REFERENCE TO RELATED APPLICATION

This application claims priority to and benefit of Italian Patent Application No. MI2011A002033 filed Nov. 9, 2011, the contents of which are incorporated by reference in their entirety.

FIELD OF THE INVENTION

The present invention relates to a machine for the blowing or stretch-blow moulding of preforms in polymeric material suitable for transforming said preforms into bottles or containers.

BACKGROUND OF THE INVENTION

Obtaining bottles or containers by blowing special preforms appropriately heated inside a mould of the desired shape is a method widely used in the packaging field, in particular for making bottles or containers.

Two basic methods exist: simple blowing and stretch-blow moulding, the latter of which provides for pneumatic blowing and contemporary mechanical stretching of the preform in the mould. In both cases the preforms must reach the blowing or stretch-blow moulding machine in a thermal condition corresponding to the softening point of the material, so they may be plastically deformed inside the moulds.

The production of such bottles usually requires a high hourly production rate so as to reduce the moulding costs of each bottle or container to a minimum, since increased costs would significantly influence the final cost of the product.

Much effort has therefore been made to automate and speed up production methods.

Machines for blowing or stretch blow moulding preforms are known and typically include a plurality of moulds which can be opened, including two half-moulds hinged at one end and actuated by means of levers appropriately positioned and sized to allow the opening and closing thereof in a synchronised manner with predefined loading phases of the preforms and unloading phases of the moulded bottle. Such levers are generally actuated by means of a shaped cam coupling, such coupling being suitable for providing reciprocated movement with progress defined by the shape of the cam.

More specifically, such coupling includes a suitably shaped so-called "cam" profile and a sliding so-called "driven" element, forced to slide along such profile and able to provide mechanical utility with movement depending on the shape of the profile.

Often, to achieve a production high rate, a plurality of moulds are positioned radially around a central rotation axis on a rotating blowing machine, wherein the means for opening and closing the moulds are synchronised with the movement of other devices which co-operate in the functioning of the machine such as a device for moving the incoming preforms and the outgoing bottles, or a blowing device for moving various components of the moulds.

This way some of the processing steps on each successive bottle according to the rotation of the machine, are performed during other processing steps on the previous bottle.

Generally, the aforesaid mechanical devices are actuated singly by separate cams, shaped on the basis of the sequence or the duration of the required movements. In particular, various devices of a mould present their respective driven elements that are projected and orientated so that in a pre-defined portion of the rotation of the machine they are channelled into respective guides or cams, shaped in a manner suitable for imparting predefined movements on the driven element, which coordinates such movements to the various devices in a predefined manner.

In particular, in previously existing rotary machines having a plurality of moulds, each mould includes two half-shells hinged around a hinge axis parallel to the rotation axis of the machine, which can be closed or opened in a synchronised manner by means of an actuating device actuated by a cam coupling.

In such machines, the half-shells have an end aperture, positioned in a direction parallel to the hinge axis, corresponding to a bottom portion of the bottle to be obtained. Such aperture is suitable for being alternatively closed and opened by a bottom suitable for being moved in a direction substantially perpendicular to the bottom of the bottle. The bottom supports a portion of mould suitable for permitting the moulding of the bottom of the bottle, which presents projections and recesses which extend in a direction substantially perpendicular to the bottom.

In such machines the bottom is moved by means of a mechanism which receives the motion from a respective driven element associated with a cam different from that actuating the opening and closing of the mould.

Such pre-existing moulds have the disadvantage that during the blowing of the preform the pressure of the fluid, generally air, inside the preform and therefore inside the mould, exerts an opening force thereon, which tends to open and misalign the edges of the half-shells resulting in the production of an imperfect bottle where the separation line between the two half shells remains clearly visible.

In an attempt to overcome this problem, certain moulds use a bolt suitable for being inserted so as to slide in peripheral passages made at one end of the mould opposite the hinge axis, which, when the mould is closed, is aligned with the other end enabling the bolt to be inserted in the passages which keeps the mould in a closed configuration during blowing. Such bolt must therefore be inserted in the passages before blowing to keep the half-shells closed and removed after blowing to enable the subsequent opening thereof. Such bolts are actuated automatically by means of a respective driven element which engages on a cam different from that performing the opening and closing of the gripper.

While resolving the problem of keeping the half-shells closed, the presence of the bolt entails the further disadvantage of slowing down the production chain in that it can only be inserted when the mould is fully closed. Thus, it is not possible to insert it during the opening and closing movement of the mould.

In addition, the presence of the bolt entails the disadvantage of having to use an additional cam and a corresponding expenditure of mechanical energy.

Such known machines also require extreme precision in the sizing and assembly of the separate cams, in positioning them in the correct relative position with each other to provide the correct mechanical synchronisation of the various mechanical devices actuated in the machine and in particular of the gripper and bottom, as well as the insertion of the bolt. When the various cams are not fitted with extreme positioning, precision forcing could occur between the various mechanical parts which would cause rapid wear of the mechanical couplings. Moreover, because of high functioning speeds, in extreme cases mechanical interferences or impact could occur resulting in damage to the machine.

For these reasons, such known machines do not allow maximum production rate to be exceeded.

SUMMARY OF THE INVENTION

The problem addressed by the present invention is to make available a machine for the blowing or stretch blow moulding of bottles in plastic material which makes it possible to overcome the drawbacks described above.

Such problem is solved by a machine described and claimed herein, the definitions of which form an integral part of this disclosure.

DETAILED DESCRIPTION

Figure 1:
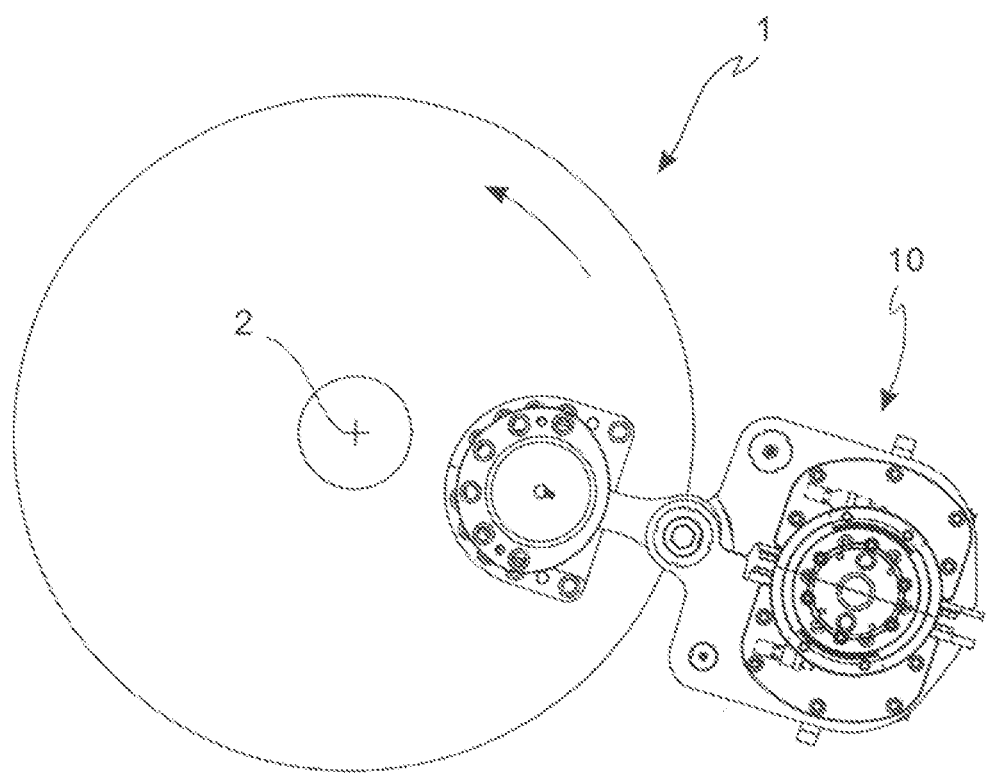
FIG. 1 shows a schematic ground view of a blowing machine or stretch blow moulding machine according to the present invention, having a plurality of mould units.

With reference to the figures, reference numeral 1 generally refers to a blowing machine or stretch blow moulding machine according to the present invention. Such blowing machines are generally of the rotary type and have a plurality of moulds 20 positioned radially in relation to a substantially vertical rotation axis 2 of the machine 1.

Each mould unit 10, rotating around the rotation axis 2 of the machine, is cyclically brought to a station for loading a preform and/or for unloading a bottle made from the preform. Between loading the preform and unloading the bottle the blowing or stretch blow moulding is performed.

Each moulding unit 10 may include a mould 20 having a first half-shell 21 and a second half-shell 22 hinged around a hinge axis 23, for example parallel to the rotation axis 2 of the machine. The hinge axis may be positioned at a lateral end of the half-shells 21 and 22 facing the axis 2 of the machine.

Figure 2:
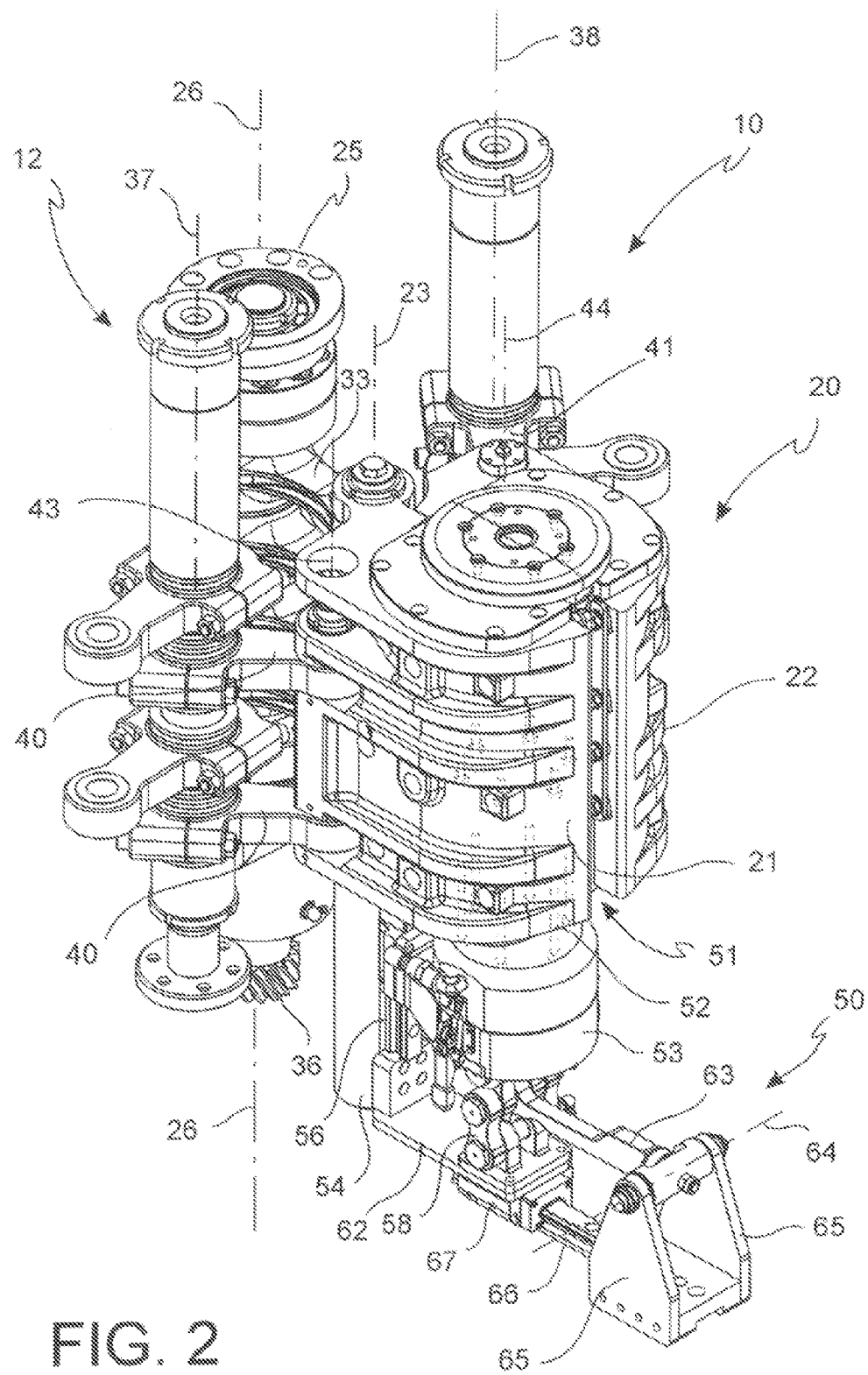
FIGS. 2 and 3 show a perspective view of a mould unit of a machine according to the invention, in a configuration showing the mould closed and opened respectively.
Figure 3:
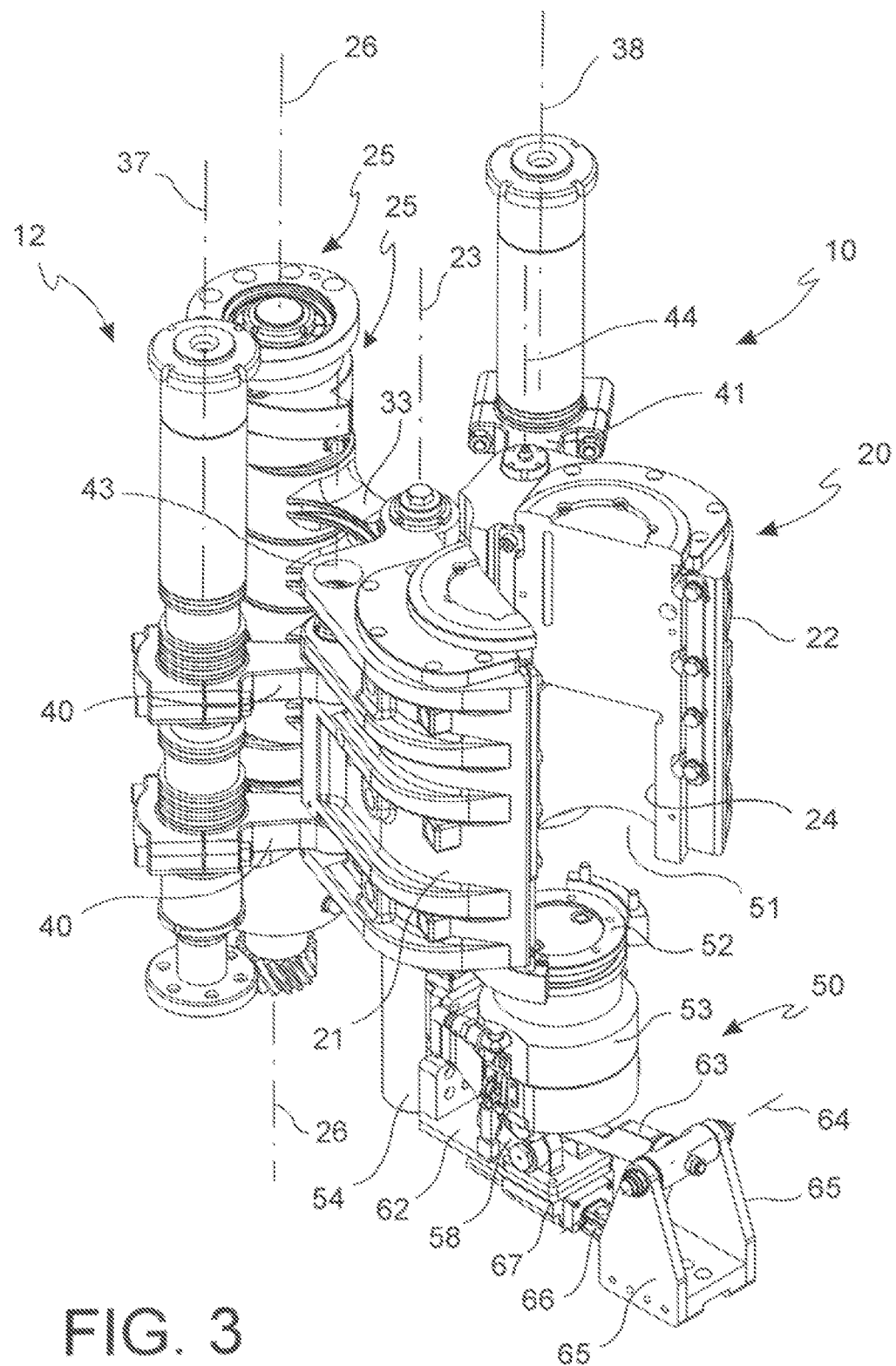
Figure 4:
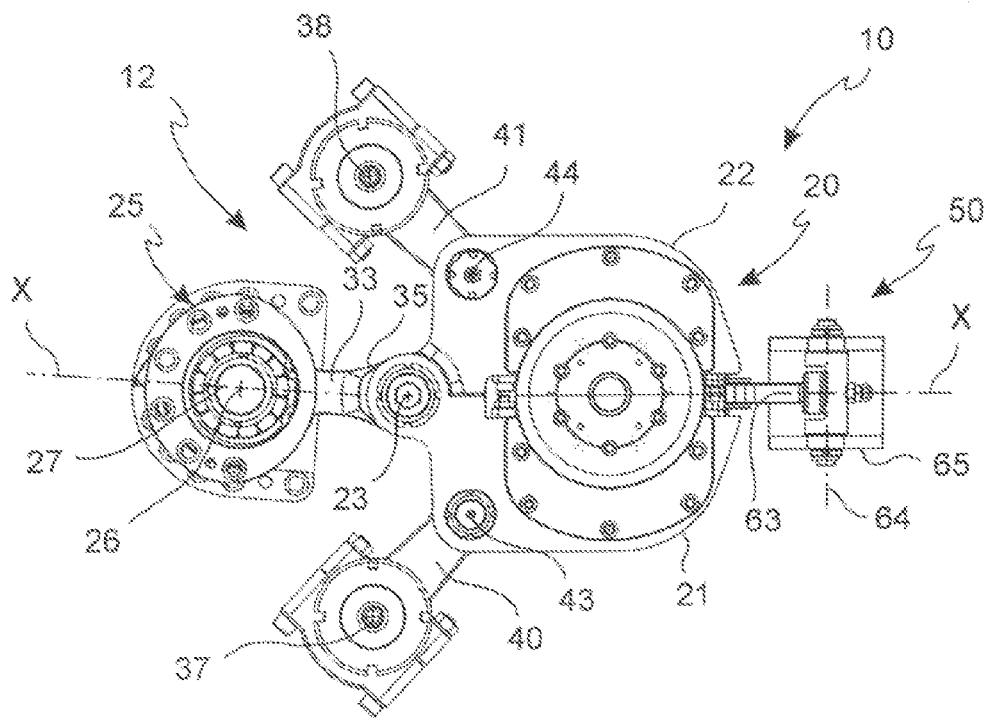
FIGS. 4 and 5 show a top view of the mould unit in FIG. 2 in a configuration showing the mould closed and opened, respectively.
Figure 5:
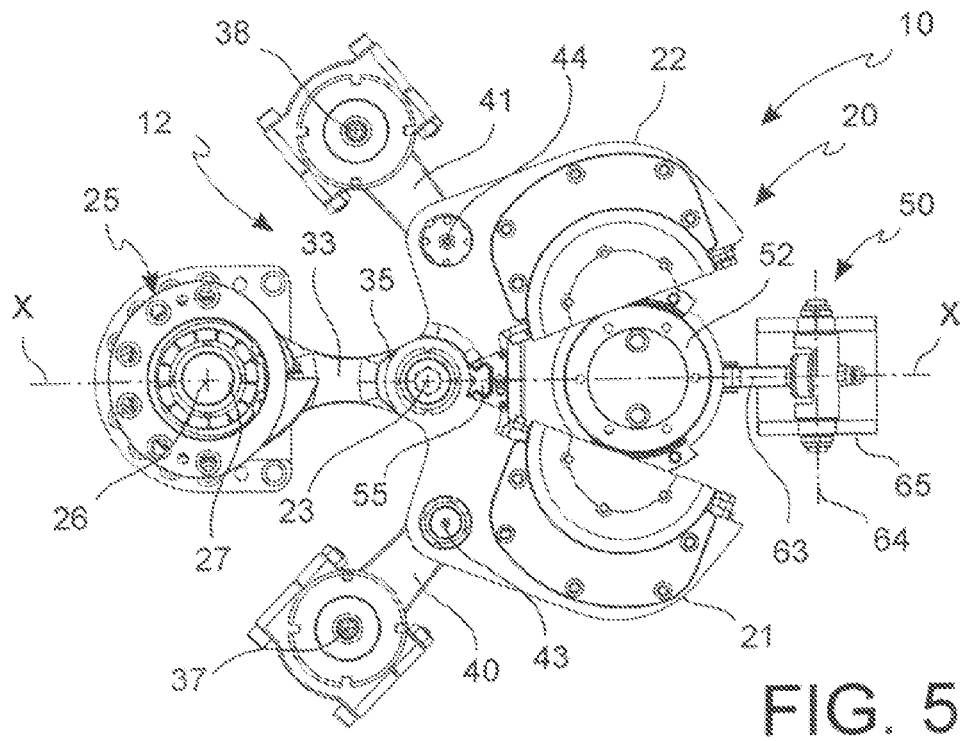
Figure 6:
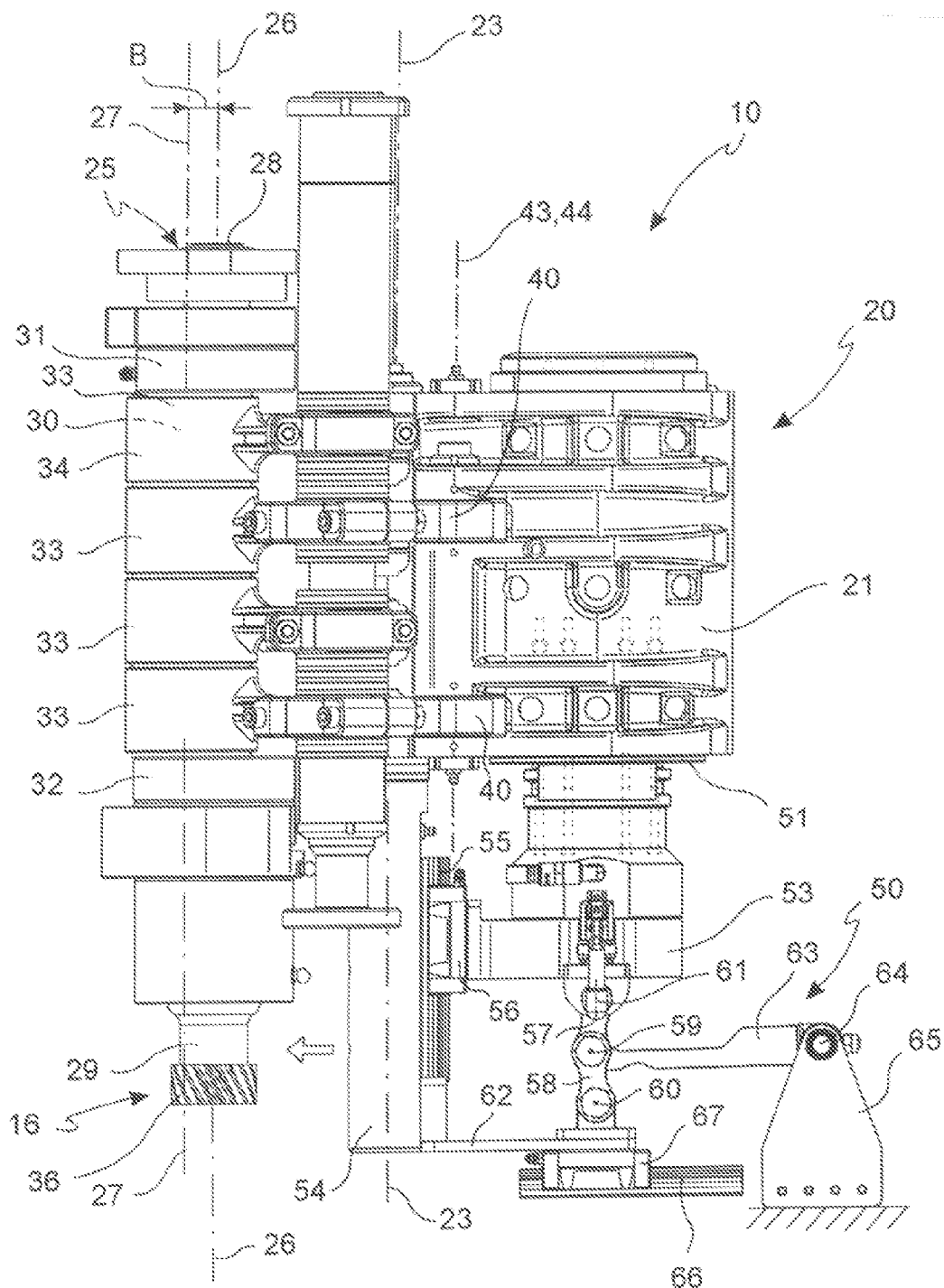
FIGS. 6 and 7 show a side view of the mould unit in FIG. 2 respectively in a configuration with the mould closed and the mould open.
Figure 7:
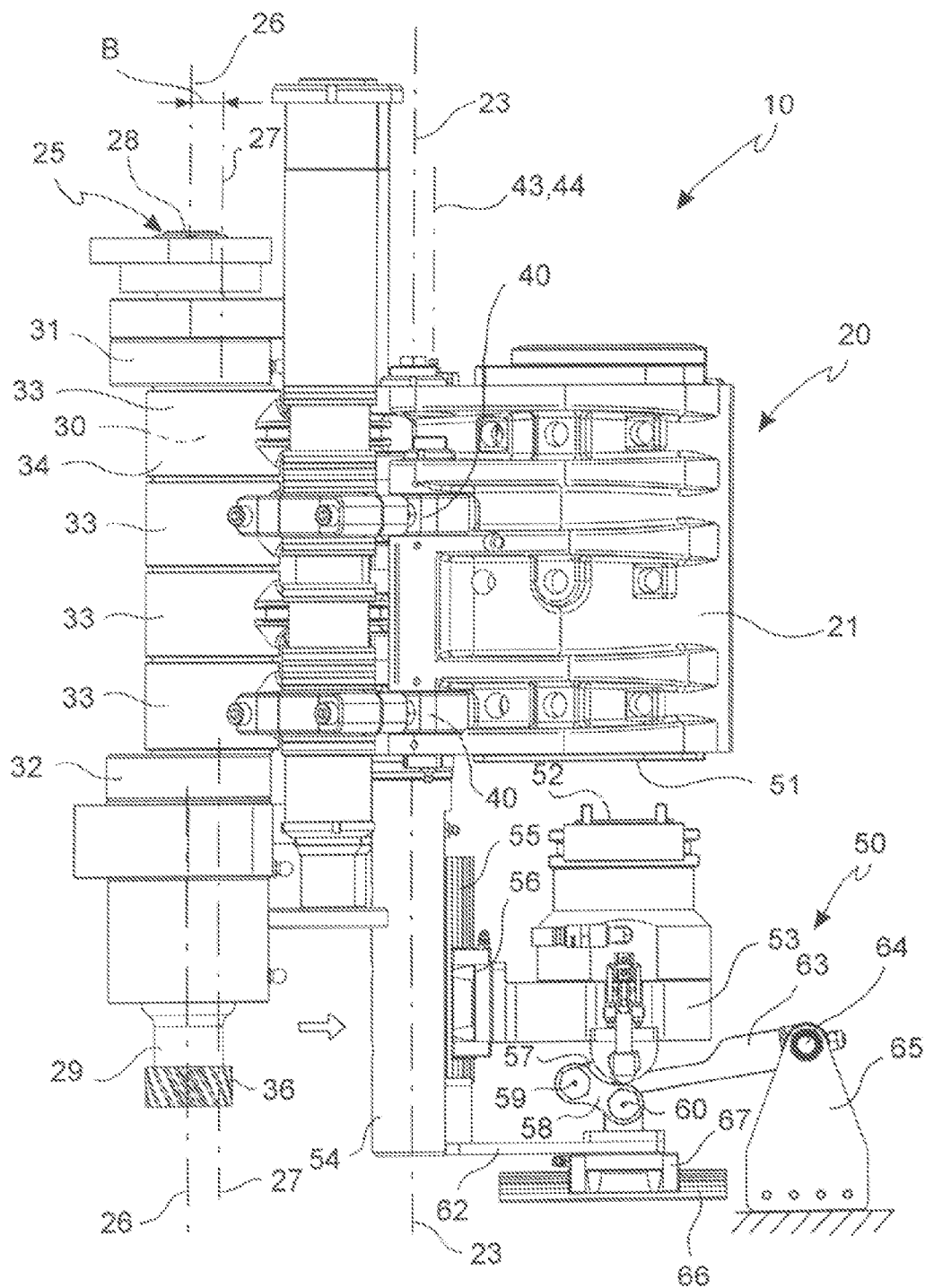

The first half-shell 21 and the second half-shell 22 are able to rotate around the hinge axis 23 between a configuration with the mould closed (as shown in FIGS. 2, 4 and 6) wherein the half-shells 21 and 22 are in contact along respective mould rims 24, and a configuration with the mould open (as shown in FIGS. 3, 5 and 7).

The half-shells 21 and 22 therefore may be opened and closed like two shells of a bivalve shell.

According to certain embodiments the half shells 21 and 22 are suitable for closing towards a closure plane X-X passing through the hinge axis 23, in particular the closure plane X-X also passing through the machine axis 2. This way each mould 2 may be opened towards the outside of the machine 1.

The moulding unit 10 includes a bottom 52 suitable for cooperating with the half-shells 21 and 22 and movement elements 50 of the bottom, to cyclically form a closed cavity 24 suitable for receiving a pre-heated pre-form and for allowing the expansion by blowing or stretch blow moulding of the pre-form inside the cavity 24 to obtain a bottle or container.

Advantageously, the half-shells 21 and 22 and the bottom 52 are actuated by opening and closing elements 12 of the half-shells 21, 22 and movement elements 50 of the bottom 52, in a synchronized manner starting from a single motion inlet 36 comprising a single cam coupling.

Advantageously, the half-shells 21 and 22 may rotate around the hinge axis 23 concurrently with a translation of said hinge axis 23 along the plane X-X in a direction substantially perpendicular to the hinge axis itself.

According to certain embodiments the half shells 21 and 22 include a respective shaped portion which repeats in negative the outer shape of the bottle to be obtained from the preform and which delimits the space inside which the preform is made to expand, wherein such shaped portion is separable from the half shells 21 and 22 and interchangeable, so as to permit the moulding of bottles of different shapes and sizes. In this manner it is sufficient to substitute the shaped portions to start the production of different bottles.

In certain embodiments, the aforesaid opening and closing elements of the mould 20 may include a throw 25 having a rotation axis 26, integral with the blowing machine 1, positioned substantially parallel to the hinge axis 23, and an eccentric axis 27, parallel to the main axis 26 and distanced from the eccentric axis 27 by a pre-set arm value B.

According to certain embodiments, the main rotation axis 26 coincides with the axis of two cylindrical end sections 28 and 29 of the throw 25, so-called "bench pins", while the eccentric axis 27 coincides with a central cylindrical section 30, so-called "crank pin" positioned between the end sections 28 and 29. The crank pin 30 may be rigidly connected to the bench pins 28 and 29 by arms 31 and 32.

According certain embodiments, the opening and closing elements may include at least one connecting rod 33 having a first end 34 rotatably connected to said eccentric axis 27 and a second end 35 rotatably connected to said hinge axis 23.

Certain embodiments may include four connecting rods 33 having a first end 34 rotatably connected to said eccentric axis 27 and a second end 35 rotatably connected to said hinge axis 23.

In certain embodiments, the opening and closing elements of the mould 20 may include at least a first crank 40 having a first end rotatably connected to a first fixed axis 37 integral with the machine 1, and a second end rotatably connected around a first axis 43 of the first half-shell 21 on the same side as the plane X-X relative to the first fixed axis 37.

In certain embodiments, the opening and closing elements of the mould 20 may include at least a second crank 41 having a first end rotatably connected to a second fixed axis 38 integral with the machine 1, and a second end rotatably connected around a second axis 44 of the second half-shell 22 on the same side as the plane X-X relative to the second fixed axis 38.

According to certain embodiments, the opening and closing elements comprise two first cranks 40 substantially equal and two second cranks 41.

According to certain embodiments, the fixed axes 37, 38 and/or the first side axis 43 and second side axis 44 may be substantially parallel to one another and substantially parallel to the hinge axis 23.

According certain embodiments, the first side axis 43 and the second side axis 44 may be distanced on opposite sides relative to the closure plane X-X.

In certain embodiments, the at least one first crank 40 and/or the at least one second crank 41 may be arranged on a plane substantially orthogonal to the hinge axis 23.

In certain embodiments, the at least one first crank 40 and/or the at least one second crank 41 may be arranged transversally to the closure plane X-X.

According to certain embodiments, the fixed axes 37, 38 may be distanced from the closure plane X-X by a value that is greater than the distance of the first side axis 43 and the second side axis 44 from the closure plane X-X.

According to certain embodiments, the first fixed axis 37 and the first side axis 43 may be specularly arranged to the second fixed axis 38 and the second side axis 44 relative to the closure plane X-X (i.e., the first and second fixed axes 37, 38 and the first and second side axes 43, 44 are symmetrically arranged with respect to the plane X-X).

In certain embodiments, the rotation of the throw 25 around its main axis 26 causes the eccentric axis 27 to rotate around the main axis 26 according to a radius equal to B. Such rotation drags the at least one connecting rod 33 so as to impart to the hinge axis 23 a reciprocating translation movement along the closure plane X-X between a closed position of the mould in which the eccentric axis 27 is aligned with the main axis 26 along the closure plane X-X and opposite the hinge axis 23 (FIG. 4), and an open position of the mould in which the eccentric axis 27 is aligned with the main axis 26 along the closure plane X-X on the same side as the hinge axis 23 (FIG. 5).

The at least one connecting rod 33 may co-operate with the at least one first crank 40 and/or the at least one second crank 41 forcing the two half-shells 21 and 22 to rotate in relation to the hinge axis 23 concurrently with the translation of the hinge axis thereby performing the opening or closing of the mould 20.

In such embodiments, the opening and closing elements of the mould 20 advantageously provide that when the mould 20 is closed, the two half-shells 21 and 22 are pressed against each other as a combined effect of the compression force exerted by the at least one first crank 40 and the at least one second crank 41 and a driving force exerted by the at least one connecting rod 33, any further opening movement of the half shells 21 and 22 thereby being prevented.

In fact, when the mould is closed, the at least one connecting rod 33 applies a force to the hinge axis 23 directed by the hinge axis 23 towards the main axis 26 of the throw 25 and concurrently each first crank 40 and second crank 41 applies, to the respective side axes 43 and 44, a respective force positioned along the line joining the fixed axis 37 and 38 and the side axis 43 and 44 facing towards the closure plane X-X. Such forces have a normal component at the closure plane X-X facing towards the closure plane X-X. This way the pressure exerted between the half shells 21 and 22 during blowing is offset by such normal components in synergy with the geometric non-yielding nature of the half shells 21 and 22.

In other words, such opening and closing elements make it possible to autolock the half shells when they are in a closed position to counteract the pressure exerted inside the cavity when the blowing activity in the preform takes place to expand and to obtain the bottle.

This makes it possible to prevent the need for the presence of locking elements suitable for keeping the half shells 21 and 22 closed during blowing. It thus eliminates the need for using a bolt suitable for keeping the half-shells closed.

As a result the present invention, inter alia, completely eliminates the waiting time for inserting and extracting the bolt before and after the blowing, with a reduction in production times and a consequent increased production rate.

According to certain embodiments, the mould unit 10 may be suitable for receiving the movement due to torque applied to the main axis 26, for example by use of a coupling with toothed wheels. For example at one end of the throw 25 a toothed wheel 36 coaxial with the main axis 26 may be present.

According to certain embodiments, the mould unit 10 comprises motion inlet elements may include suitable for taking the motion from a mated profile coupling and transmitting it to the throw 25 by applying a torque around the main axis 26.

According to one embodiment, such motion inlet elements comprise a rotation axis 70, a toothed wheel section 71 suitable for rotating around the rotation axis 70 and suitable for meshing with the toothed wheel 36, a crank 72 integral with the toothed wheel section 71, having a rotation axis coinciding with the axis 70, a crank end having a projecting or driven pin 73, suitable for engaging slidingly on a shaped profile or cam, shaped so as to impart on the toothed wheel section 71 a rotation of a value suitable for making the toothed wheel 36 rotate at a predefined angle so as to complete an entire opening-closing cycle of the mould 20.

In certain embodiments, such predefined angle to bring the mould 20 from the open to the closed configuration or vice versa is substantially equal to about 180°.

In certain embodiments, the half-shells 21 and 22 may include a bottom aperture 51 corresponding to a bottom portion of the bottle to be obtained, said aperture being suitable for being closed alternatively by the aforementioned bottom 52, so that said aperture is closed by said bottom 52 when the half shells 21 and 22 are closed, and is open when the half-shells 21 and 22 are open.

In certain embodiments, the aperture 51 may be obtained in a direction parallel to the hinge axis 23 and is positioned in a lower area of the half shells 21 and 22.

According to certain embodiments the mould unit 10 may include automatic movement elements 50 of the bottom 52, in particular elements suitable for translating the bottom in a direction parallel to the hinge axis 23 between a lower open position and an upper closed position.

In certain embodiments, the mould unit 10 may include a hinge pin 54 having an axis 23 coinciding with the hinge axis 23, said hinge pin extending beyond the half shells 21 and 22 on the side of the bottom aperture 51 and a bracket 53 slidingly connected to the hinge pin 54 in such a way as to translate along the hinge axis 23, such bracket 53 integrally supporting the bottom 52.

According to certain embodiments, the bracket 53 may be connected to the hinge pin 54 by a sliding guide 55 parallel to the hinge axis 23 and integral with the hinge pin 54, and a saddle 56 integral with the bracket 53 and sliding on the guide 55.

According certain embodiments, the movement elements 50 of the bottom 52 may include at least a pair of connecting rods 57 and 58 may be mounted in series and rotatably mutually connected around a common rotational axis 59, so that a first end of one connecting rod 57 is connected to a first end of the other connecting rod 58. Such connecting rods 57 and 58 are fitted interposed between the bracket 53 and a support arm 62 fixed to the hinge in 54 on the side opposite the bracket 53 in relation to the connecting rods 57 and 58, and have a second end connected so as to rotate in relation to the bracket 53 and the support arm 62. Such movement elements may further include an operation arm 63 having a first end rotatably connected to the connecting rods 57 and 58 around the common rotation axis 59, and a second end rotatably connected to a fixed axis 64 integral with the machine 1. The arm 63 may be positioned in such way as to rotate on the closure plane X-X around the fixed axis 64, which belongs to a support 65 integral with the machine 1.

The functioning of the movement elements 50 of the bottom 52 is described below.

The translation movement of the hinge axis 23 along the closure plane X-X brings the hinge pin 54 into reciprocating translation motion between an open position and a closed position of the half-shells. When the hinge pin 54 is in the open position of the moulds (FIG. 7), and thus in the position furthest away from the main axis 26 of the throw 25, such hinge pin is in the position closest to the fixed axis 64 of the arm 63. In such configuration the second ends of the connecting rods 57 and 58 are constrained to rotate towards each other around the common axis 59 causing the bracket 53 and the support arm 62 to move towards each other and thereby the distancing of the bottom 52 from the aperture 51.

When, instead, the hinge pin 54 is in the closed position of the moulds (FIG. 6), the hinge pin 54 is in the position closest to the main axis 26 of the throw 25 and therefore in the position furthest away from the axis 64. In this configuration the second ends of the connecting rods 57 and 58 are made to rotate away from each other causing the distancing of the bracket from the support arm 62, and thereby the movement of the bottom 52 towards the aperture 51.

According to certain embodiments, the mould unit 10 may include guide elements suitable for constraining the movement of the hinge axis 23 to translation only in a direction orthogonal to said axis 23 and along the closure plane X-X.

In certain embodiments, such guide elements may include a guide 66 substantially orthogonal to the hinge axis 23 and belonging to the closure plane X-X, integral with the machine 1, and a saddle 67 integral with the hinge axis 23 and sliding in such a guide 66.

According to certain embodiments the saddle 67 may be fixed to the support arm 62.

Clearly only certain embodiments of the present invention have been described, to which a person skilled in the art based on the present disclosure may make the modifications needed for its adaptation to specific applications, while remaining within the intended scope of protection of the present invention.

The invention claimed is:

1. A machine for blowing or stretch-blow moulding of bottles or containers having a plurality of moulding units, each moulding unit comprising a lateral first half-shell and a second half-shell, hinged about a hinge pin having a hinge axis, and a bottom cooperating with said first half-shell and second half-shell in order to cyclically form a closed cavity suitable for receiving a pre-heated pre-form and for allowing the expansion by blowing or stretch blow moulding of the pre-form inside the cavity so as to obtain a bottle or container, said moulding unit being arranged to cyclically assume a closed mould configuration and an open mould configuration towards and away from a closure plane X-X passing through said hinge axis, said mould unit comprising opening and closing elements of the half-shells and handling elements of the bottom, wherein:
   said half-shells and said bottom are actuated by said opening and closing elements of the half-shells and handling elements of the bottom in a synchronized manner starting from a single motion inlet comprising a single cam coupling; and
   said half-shells are configured to rotate about said hinge axis concurrently with a translation of said hinge axis along the plane X-X in a direction that is substantially perpendicular to the hinge axis itself.

2. The machine of claim 1, wherein said opening and closing elements comprise at least one connecting rod for translating said hinge axis along the plane X-X, alternately between a forward position and a rear position, and wherein said half-shells are movably connected to a fixed constraint through connection elements, so that said half-shells are open in said forward position and closed in said rearward position.

3. The machine of claim 2, wherein said connection elements comprise at least one crank.

4. The machine of claim 1, wherein said opening and closing elements are suitable to automatically lock and press said half-shells against one another, when the mould unit is in the closed mould configuration, by applying closing forces that converge in a substantially tangential direction with respect to said hinge axis.

5. The machine of claim 1, wherein said opening and closing elements comprise:
   a throw having at least one main portion having a rotational axis that is substantially parallel to said hinge axis, and an eccentric portion with an axis that is parallel to said main rotational axis and spaced from the eccentric axis by a pre-set arm value B;
   at least one connecting rod having a first end rotatably connected to said eccentric portion, and a second end rotatably connected to said hinge axis;
   at least a first crank having a first end rotatably connected to a first fixed axis that is integral to the machine, and a second end rotatably connected about a first side axis of said first half-shell on the same side of the closure plane X-X with respect to said first fixed axis;
   at least a second crank having a first end rotatably connected to a second fixed axis that is integral to the machine, and a second end rotatably connected about a second side axis of the second half-shell on the same side of the closure plane X-X with respect to the second fixed axis;
   wherein, in said closed mould configuration, said eccentric axis is aligned with said main axis along the closure plane X-X and on the opposite side relative to the hinge axis with respect to the main axis, and in said open mould configuration, the eccentric axis is aligned with the main axis along the closure plane X-X and sandwiched between said main axis and said hinge axis.

6. The machine of claim 1, wherein said fixed axes and said first side axis and second side axis are substantially parallel to one another and substantially parallel to the hinge axis.

7. The machine of claim 1, wherein said at least one first crank and/or said at least one second crank are transversally arranged relative to the closure plane X-X, and/or wherein said first and second fixed axes are spaced from the closure plane X-X by a value that is greater than the distance of said first and side axes from the closure plane X-X, and/or wherein said first and second fixed axes are interposed between said side axes and said main axis.

8. The machine of claim 1, wherein said first fixed axis and said side axis are specularly arranged to the second fixed axis and the second side axis relative to said closure plane X-X.

9. The machine of claim 1, comprising guide elements suitable for allowing the hinge axis to move in a direction that is orthogonal to the hinge axis and along the closure plane X-X.

10. The machine of claim 1, wherein said guide elements comprise a guide substantially orthogonal to the hinge axis that is integral to the machine and belonging to the closure plane X-X, and a saddle integral to the hinge axis which slides in such a guide.

11. The machine of claim 1, wherein said bottom handling elements comprise:
   sliding engagement elements of said bottom to said hinge pin that allow an approaching or moving away of said bottom to/from said half-shells;
   at least a pair of connecting rods mounted in series and mutually rotatably connected about a common rotational axis, so that a first end of a connecting rod is connected to a first end of the other connecting rod, and a second end is connected to said bottom and to a support arm, respectively, which is transversally fixed in an integral manner to said hinge pin, said pair of connecting rods being sandwiched between said bottom and said support arm;

an operation arm having a first end rotatably connected to said first ends of said connecting rods about the common axis, and a second end rotatably connected to a fixed axis, which is integral to the machine, said approaching or moving away movement of said bottom being directly actuated by said translation movement of said hinge pin.

12. The machine of claim 1, wherein each of said mould units comprises motion inlet elements comprising:

a toothed wheel section, having a fixed rotational axis, which is integral to the machine, suitable to gear with a toothed wheel that is integral to and coaxial with a main portion of the throw; and a crank that is integral to the toothed wheel section, having a first end rigidly connected to said toothed wheel section along its axis, and a second end having a projecting pin suitable to slidingly engage along a shaped guide cam.

* * * * *